United States Patent

[11] 3,607,452

[72] Inventor Michael N. Marosi
 4153 Hayvenhurst Drive, Encino, Calif. 91316
[21] Appl. No. 737,863
[22] Filed June 19, 1968
[45] Patented Sept. 21, 1971

[54] COLOR COATING FOR ALUMINUM PRODUCTS
 16 Claims, No Drawings
[52] U.S. Cl............................................... 148/6.2, 148/6.27, 117/132
[51] Int. Cl............................................... C23f 7/26
[50] Field of Search................................. 148/6.2, 6.27; 117/132; 260/80.8, 29.6, 85.5

[56] References Cited
UNITED STATES PATENTS

| | | | |
|---|---|---|---|
| 3,316,200 | 4/1967 | Hatala............................ | 260/80.8 |
| 3,236,798 | 2/1966 | Dunnavant et al............. | 260/29.6 |
| 3,036,934 | 5/1962 | Horton et al................... | 148/6.2 |

Primary Examiner—Ralph S. Kendall
Assistant Examiner—Caleb Weston
Attorney—Robert Louis Finkel ABSTRACT: A process for forming a clear, unpigmented colored acryloid plastic protective coating on aluminum surfaces; the composition of materials forming the color coating; and the coated aluminum products of the process.

COLOR COATING FOR ALUMINUM PRODUCTS

This invention relates to protective color coatings for metal products, and particularly to a novel clear, unpigmented colored acryloid plastic coating for aluminum surfaces. The invention encompasses not only the process for forming the color coating, but also the composition of the acrylic emulsion employed in its practice, and the coated products themselves.

Science and industry have long recognized the desirability of providing coatings to protect metallic surfaces from the effects of wear, and chemical reaction and corrosion. With certain alloys of aluminum, because of their susceptibility to corrosion and marring the need for protective coating is critical. For some commercial uses of aluminum the ability to control the aesthetic appearance of these coatings, and especially their color and surface texture is as important as, or more important than, their durability.

Heretofore, the manufacturer or fabricator of aluminum products has had a variety of coating processes from which to choose: painting, lacquering, the many chemical and electrolytic deposition techniques such as plating, anodizing, chromating, and the like and, more recently, dipping or spraying with plastic materials. All of these methods, however, are subject to deficiencies which make them less than satisfactory for commercial use.

Paint hides the natural beauty of the underlying surface material itself. Lacquer is costly to apply and, because of its brittleness lacks the durability required where it is exposed to blows, shock or abrasion. Electroplating and the other electrolytic processes are often too expensive and require relatively sophisticated plant facilities and handling techniques.

The principal object of the subject invention is to provide a process for forming a protective color coating on aluminum which overcomes these deficiencies. The manner in which it does so, and the numerous additional advantages presented by it will become apparent in reading the description which follows.

Polymers of acrylic acid were first described in 1872, and the polymerization of its esters was noted shortly thereafter. The use of polyacrylates as ingredients for paints and lacquers has been known since 1915, and industrial preparations of methyl acrylate polymers were available in this country for use as coatings as early as 1931. Before 1937 the advantages of copolymers of acrylonitriles and acrylic esters for use as coatings on metal, wood and glass surfaces were widely heralded.

These copolymers were used either as pigment carriers in paints, or as clear and colorless films. In both uses, pains were invariably taken to avoid discoloration resulting from chemical deterioration, exposure to ultraviolet light, and the reaction of the copolymer with ozone in the atmosphere. The subject invention departs from the prior art uses of such copolymers in that it actually induces the controlled coloration of acrylic materials and deposits them to form a protective color coating where desired on a variety of metallic surfaces. The process of the invention has proved particularly effective as applied to products of aluminum and its alloys.

In one preferred method of practicing the subject invention, the surface of the article to be color coated is thoroughly cleaned and then dipped into a chemical bath comprising a copolymer type aqueous acrylic emulsion and a coalescing solvent, with a small amount of iron oxide serving as a catalyst. The bath is maintained at an elevated temperature and moderately basic pH. After a carefully controlled period of immersion the article is removed from the coloring bath and force dried in an oven. The resulting product's surface at this point is found to be covered with a thin durable, corrosion-resistant, clear acryloid base coat in any desired color ranging from a very dark brown, approaching black, through a golden yellow. The coated article is again briefly reimmersed in the same acrylic emulsion to form a second clear, colorless coating, and again force dried and baked. This second coat forms a transparent glossy protective layer permanently bonded over the base coat.

In actual practice, the article to be coated, for example an extruded aluminum strip for use in window sash, is washed in plain water to remove any superficial foreign matter on its surface. With other materials, or if the surface is particularly dirty or has previously been coated, special treatment employing conventional methods may be required to remove paint, rust or other deposits which might prevent the acrylic coating from adhering to, and reacting with the base metal.

The surface is then chemically cleaned, preferably by immersing the entire strip in a cleaning bath containing a weak detergent. Quite satisfactory results have been achieved using a 1-2 percent aqueous solution of one of the commonly available nonionic detergents heated to a temperature of about 110° F. Generally a few minutes in this bath are sufficient to allow the cleansing liquid to remove the superficial layer of dirt, oil and grease which cling to fabricated products. For heavier deposits, a longer period of immersion may be called for. Agitation of the strip for the cleansing liquid itself will insure that the foreign materials dislodged from the metal surface will be carried away with the detergent liquid.

When thoroughly clean, the strip is removed from the detergent bath and rinsed with an abundance of clean water at room temperature to remove the last traces of the detergent and its entrapped impurities.

Aluminum, and especially aluminum of a high degree of purity, exhibits so great an affinity for oxygen that immediately upon exposure of its surface to the air it forms a thin transparent coating of metallic oxide. While the acryloid color coating of the subject invention will adhere to this surface coating, experience has demonstrated that a far better bond can be established by first lightly etching the metallic surface to remove most of this film and then passivating the surface to inhibit further oxidation.

In the case of the extruded aluminum strip referred to earlier, this phase of the process of the subject invention employs a caustic reagent to convert a substantial portion of the surface layer of aluminum oxide into sodium aluminate and other oxidation products, which are thereby freed from the surface of the metal. This is most easily accomplished by dipping the strip in a 5 percent solution of sodium hydroxide for a period of from two to four minutes. If the solution is maintained at a temperature of approximately 150° F. to 170° F. substantially all of the oxide can be converted with only slight etching of the underlying metal body.

Next the aluminum strip is rinsed thoroughly with tap water at room temperature to remove the sodium hydroxide solution.

The surface is then quickly passivated by submerging the strip in a special acid bath which reacts with the oxidation products freed by the action of the caustic soda on the aluminum oxide layer in the etching stage just described. This bath is an aqueous solution containing, for best results, 1-2 percent sodium dichromate, 0.1-0.2 percent sodium bifluoride, and 5-10 percent sulfuric acid by weight. The products of the reaction of this solution with the sodium aluminate and other oxidation products remaining on the metallic surface are readily soluble in the solution. After a period of 1 to 2 minutes in this solution at room temperature, the strip is removed and washed thoroughly with tapwater at room temperature to remove all traces of the reagent and the reaction products. In order to avoid the creation of water spots on the surface to be coated, the strip may be blown dry with compressed air or heated, as by immersing for one-half to 1 minute in clear water maintained at a temperature of 160° to 190° F. to cause a rapid drying of the metal in air. Longer immersion may be desirable for effective air drying, but care should be taken to avoid quenching which would close the surface pores and reduce the metal's reactive surface area. The aluminum strip is now ready for the color coating stage of the process.

In this stage the dried strip is immersed in an acrylic coloring bath, which is an emulsion containing a copolymer of one or more of the acrylonitriles, preferably methacrylonitrile, and an alkyl acrylate, preferably methyl acrylate, or a methacrylate, preferably methyl methacrylate. Experimentation has failed to reveal a single alkyl acrylonitrile or acrylate which will not perform satisfactorily in the formation of the required color coat.

For best results, regardless of the composition of the copolymer selected, it has been found that the ratio between the acrylonitrile solids and the acrylate solids should be about 35-50 percent, and preferably from 41-44 percent, of the former to about 1-10 percent, and preferably from 2-5 percent, of the latter.

To aid in the formation of the acryloid film, an emulsified coalescing agent is sued. Any of the conventional acryloid solvents such as the phenyl ethers are useable; however, excellent results have been achieved with the esters of ethelyne glycol, such as ethelyne glycol butyl ether. Generally, the coalescing agent will comprise between about 3-15 percent and preferably from about 5-8 percent by weight of the resin content of the acrylic emulsion.

To insure proper emulsification of the coalescing agent and the acrylic copolymer, a surfactant embodying any compatible conventional surface-acting wetting agent must be used. In addition to its role in maintaining and stabilizing the solids in emulsified form, this system contributes considerably to the formation of the surface coating film. In this connection surfactants containing anionic sulfonated alkyl esters, such as sodium dioctyl sulfosuccinate, have been very effective. Typically only from about 0.1-0.4 percent by weight of the acryloid solids in this wetting agent is required for adequate emulsification and film formation.

The coloring bath is maintained at a pH of between 8.5 and 10.5. Any convenient inorganic base, such as amonium hydroxide may be used for this purpose; however, practice has demonstrated the advantage of using one or more of the aliphatic amines having a boiling point above 130° F. and having at least two carbon atoms in their molecules. Thus di- or triethylamine, ethylenediamine or ethanolamine would be preferable to amonium hydroxide.

Iron oxide, preferably in the form of powdered or shaved ferric oxide is employed as a catalyst. From 0.01-0.3 percent of oxide by weight of the resin content has been found adequate for this purpose.

The color bath is maintained at a temperature from about 80° to 200° F., and preferably between 110° and 200° F. at all times during this stage of the process.

The aluminum extrusion remains in this bath for from 10 to 60 minutes, depending upon the color sought to be imparted to the acrylic coating and the load of materials in the bath at the same time. As will be discussed later, the color of the polymeric coating is dependent upon the pH of the emulsion and the duration of immersion of the article being coated in the color bath.

The chemical process involved in the formation of the color coating is not known, and attempts using both chemical and spectrographic methods to analyze the composition of the coating itself have been unsuccessful. It is believed, however, that the acrylic copolymer reacts in some manner with the metallic surface or with the thin film of oxide remaining on the surface after the cleansing and passivating steps to form one or more chemical complexes having the observed characteristics and color range.

This belief is reinforced by the fact that when the iron oxide catalyst is omitted from the polymeric bath either the colored base coat is not formed at all, or forms so slowly as to render the process wholly unsuitable for commercial use.

After the desired color has been reached, the strip is removed from the bath and force dried in an oven maintained at between 200° and 350° F. for from 2 and 30 minutes, depending upon the thickness of the coat formed on the surface, the configuration of the article, and the specific composition of the emulsion itself. When the color coating is thoroughly dry, the strip is removed from the oven and allowed to cool to room temperature.

While the single layer of colored acryloid plastic material is extremely durable and resistant to abrasion and chemical action, where extremely hard use and chemical exposure are anticipated it has been found advantageous to apply one or more additional thin protective coats of acrylic material over the color coat. This is accomplished most readily by reimmersing the coated strip in the same color bath for from 2 to 30 seconds to form a clear colorless film from about 0.7 to about 1.5 mils in thickness and then baking the film dry in an oven at from 200° to 350° F. for from 1 to 5 minutes. After each such protective coat has been baked it is cooled to room temperature, this step may be repeated as many times as desired.

As noted earlier, the color or shade of the acrylic coating is dependent upon the pH and the time of immersion of the article being coated. The higher the pH, the darker the coating for any given immersion time. The longer the article is immersed, the darker the coating for any given pH. FIG. 1 and 2 below illustrate the relationships between color and pH and immersion time as determined experimentally employing an acrylic emulsion containing 43 percent methacrylonitrile and 3 percent methyl acrylate, approximately 7.5 percent ethylene glycol butyl ether, and approximately 0.3 sodium dioctyl sulfosuccinate, with diethylamine used to adjust the pH.

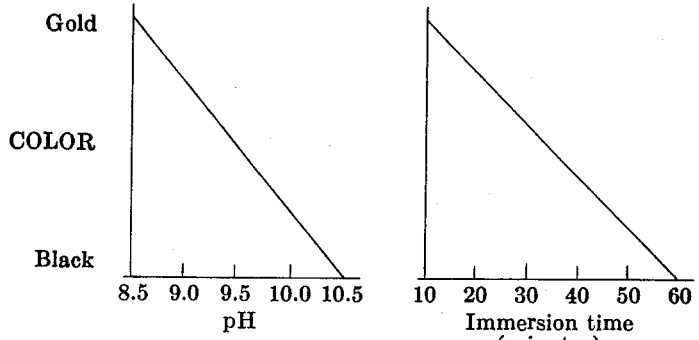

Figure 1 — Figure 2

Since the color response appears to be nearly linear with respect both to pH and immersion time, it is possible to predict with a fair degree of accuracy the conditions required to produce any given color or shade.

In order to test the durability and chemical resistivity of the protective color coat of the subject invention a number of samples were prepared using the process and subjected to a series of evaluation tests. The samples were 11-inch lengths cut from a random selection of aluminum extrusions commonly used in the fabrication of window sash, screen doors, and commercial and household fixtures.

In the first test the samples were exposed to a standard 20 percent salt fog in a slat spray cabinet maintained at 95° F. Each sample was examined intermittently for evidence of corrosion. No corrosion or other evidence of attack by the salt fog was present after 2,924 hours of exposure.

In the second test a mixture of building lime and building sand was mixed with water to make a soft paste and applied to the surface of the samples and allowed to dry at room temperature for 24 hours. The mortar was removed from the specimens by rinsing in clear water, and the specimens then blown dry by using gaseous nitrogen. Each of the specimens was examined and showed no staining of the protective coating or underlying aluminum resulting from its exposure to the strongly alkaline mortar.

In the third test a freshly prepared 4 percent by volume solution of 37 percent hydrochloric acid in water was applied to the samples used in the aforementioned alkali test and allowed to stand for 15 minutes at room temperature. The acid was removed from the specimens by rinsing with clear water, and the exposed surfaces blown dry with gaseous nitrogen. Examination of the coating on each of the specimens showed no evidence whatever of staining or damage to either the coating itself or the underlying aluminum.

I claim as my invention:

1. The process of coating aluminum products with a thin clear selectively colored layer of adhering material formed by the chemical action upon aluminum of a formulated aqueous acrylic emulsion comprising a copolymer of about 35 to 50 parts by weight of one or more of the alkyl acrylonitriles and about 1 to 10 parts by weight of one or more of the alkyl acrylates and alkyl methacrylates, about 1 to 9 parts by weight of a coalescing aide, and about 0.036 to 0.24 parts by weight of an anionic wetting agent, said emulsion being maintained at a temperature between about 80° to 200° F. and a pH of between about 8.5 and 10.5.

2. The process of claim 1 in which the aluminum product has a natural aluminum oxide coating and the process includes the conversion of at least a portion of the copolymer in said acrylic emulsion into a colored material formed by the chemical inter action of said aluminum oxide and said copolymer.

3. The process of claim 2 in which the aluminum product is first cleansed of foreign substances adhering thereto, the aluminum surface is treated to free said oxides from adherence thereto, and thereafter said oxides are allowed to react with said acrylic emulsion and to form and deposit on said surface a thin coating of the colored material resulting from such reaction.

4. The process of claim 3 in which the reagent for freeing the oxides is a weak alkaline solution.

5. The process of claim 4 in which following the freeing of said oxides the surface is treated with a formulated aqueous solution containing about 1 to 2 percent sodium dichromate, about 0.1 to 0.2 percent sodium bifluoride, and about 5 to 10 percent of sulfuric acid.

6. The process of claim 3 in which the copolymer of said acrylic emulsion comprises about 41 to 44 parts by weight of alkyl acrylonitrile solids and about 2 to 5 parts by weight of alkyl acrylate and alkyl methacrylate solids, and iron oxide is employed to catalyze the reaction of the aluminum oxides with the acrylic emulsion.

7. The precess of claim 6 in which said coalescing aid is ethelyne glycol butyl ether.

8. The process of claim 6 in which said acrylonitrile is methacrylonitrile.

9. The process of claim 6 in which said copolymer comprises methacrylonitrile and methyl acrylate.

10. The process of claim 6 in which said copolymer comprises methacrylonitrile and methyl methacrylate.

11. The process of claim 6 in which said catalyst comprises about 0.01 to 0.3 percent by weight of the resin content of the acrylic emulsion.

12. A process for forming on aluminum products a thin clear selectively colored corrosion resistant film comprising:
lightly etching the product with a solution containing about 5 percent sodium hydroxide at a temperature of about 150° to 170° F;
rinsing the product in water to remove the sodium hydroxide solution;
passivating the surface with a formulated aqueous acid solution comprising about 1 to 2 percent sodium dichromate, about 0.1 to 0.2 percent sodium bifluoride, and about 5 to 10 percent sulfuric acid at room temperature;
rinsing the product in water to remove all traces of the acid solution;
drying the surface;
exposing the surface for a selected period from about 10 to 60 minutes to an aqueous acrylic emulsion containing about 41 to 44 parts by weight of methacrylonitrile, about 2 to 5 parts by weight of an alkyl acrylate or a methacrylate, about 1 to 9 parts by weight of a coalescing acryloid solvent, about 0.03 to 0.35 parts by weight of an anionic wetting agent, and about 0.003 to 2.00 parts by weight of catalytic iron oxide, maintained at a selected temperature between about 80° to 200° F. and a selected pH of between about 8.5 and 10.5;
force drying the thin colored layer of acrylic emulsion adhering to the surface at a temperature between about 200° and 350° F;
reexposing the surface to the same aqueous acrylic emulsion for from 2 to 30 seconds; and
force drying the thin colorless protective layer of acrylic emulsion adhering to said colored layer at a temperature between about 200° and 350° F.

13. The process of claim 12 in which said alkyl acrylate is methyl acrylate and said methacrylate is methyl methacrylate.

14. The process of claim 13 in which the pH of the acrylic emulsion is adjusted by the addition thereto of an aliphatic amine having at least two carbon atoms in its molecule.

15. The process of claim 14 in which said amine is diethylamine, triethylamine, ethylenediamine or ethanolamine.

16. A product having an exposed aluminum surface, said surface being coated with a thin clear selectively colored layer the principal component of which is an adhering material resulting from the chemical reaction of aluminum oxide on said surface with a formulated acrylic emulsion comprising a copolymer of about 35 to 50 parts of one or more of the alkyl acrylonitriles and about 1 to 10 parts of one or more of the alkyl acrylates and alkyl methacrylates, about 1 to 9 parts of a coalescing aid, and about 0.036 to 0.24 parts of an anionic wetting agent in the presence of about 0.003 to 2.00 parts of catalytic iron oxide, said emulsion being maintained at a temperature between about 80° and 200° F. and a pH of between about 8.5 and 10.5.